(12) United States Patent
Karamanev (10) Patent No.: US 10,527,065 B2
(45) Date of Patent: Jan. 7, 2020

(54) VARIABLE PRESSURE VESSEL

(71) Applicant: ISOCURRENT ENERGY INCORPORATED, Toronto, ON (CA)

(72) Inventor: Dimitre Karamanev, London (CA)

(73) Assignee: ISOCURRENT ENERGY INCORPORATED, Toronto, ON (CA)

( * ) Notice: Subject to any disclaimer, the term of this patent is extended or adjusted under 35 U.S.C. 154(b) by 0 days.

(21) Appl. No.: 15/778,936

(22) PCT Filed: Nov. 25, 2016

(86) PCT No.: PCT/CA2016/051395
§ 371 (c)(1),
(2) Date: May 24, 2018

(87) PCT Pub. No.: WO2017/088065
PCT Pub. Date: Jun. 1, 2017

(65) Prior Publication Data
US 2018/0347595 A1 Dec. 6, 2018

Related U.S. Application Data (60) Provisional application No. 62/304,297, filed on Mar. 6, 2016, provisional application No. 62/274,350, filed
(Continued)

(51) Int. Cl.
*F16L 55/04* (2006.01)
*F15B 1/02* (2006.01)
(Continued)

(52) U.S. Cl.
CPC ............. *F15B 1/025* (2013.01); *F04B 43/08* (2013.01); *F15B 1/103* (2013.01); *F15B 1/165* (2013.01);
(Continued)

(58) Field of Classification Search
CPC ...... F15B 1/08; F15B 1/10; F15B 1/16; F15B 1/24; F15B 1/103; F15B 1/165; F16L 55/04
(Continued)

(56) References Cited

U.S. PATENT DOCUMENTS 2,317,395 A 4/1943 Mercier
2,663,320 A * 12/1953 Snyder ..................... F15B 1/24
138/31

(Continued)

FOREIGN PATENT DOCUMENTS

| CA | 2012269 A1 | 9/1990 |
|---|---|---|
| GB | 804500 | 11/1958 |
| WO | 2013112892 A1 | 8/2013 |

OTHER PUBLICATIONS

International Search Report for PCT/CA2016/051395 dated Feb. 10, 2017.
Written Opinion for PCT/CA2016/051395 dated Feb. 10, 2017.

*Primary Examiner* — Patrick F Brinson
(74) *Attorney, Agent, or Firm* — Hill & Schumacher (57) ABSTRACT

The present disclosure relates to a variable pressure vessel. The vessel includes a liquid chamber and a gas chamber and a moveable barrier therebetween. The vessel has a volume, a first stroke, and a second stroke. The liquid chamber and the gas chamber each have a variable volume that changes responsive to the first stroke and the second stroke. The gas chamber has an outer wall wherein at least a portion of the outer wall is thermally conductive and allows heat to transfer therethrough. Movement of the moveable barrier between the liquid chamber and the gas chamber causes the volume in the liquid chamber and the volume in the gas chamber to displace each other. The volume in the gas
(Continued)

chamber plus the volume in the liquid chamber is generally constant and generally equals the volume in the variable pressure vessel.

28 Claims, 10 Drawing Sheets

Related U.S. Application Data on Jan. 3, 2016, provisional application No. 62/260,240, filed on Nov. 25, 2015.

(51) Int. Cl.
*F17C 1/00* (2006.01)
*F04B 43/08* (2006.01)
*F15B 1/10* (2006.01)
*F15B 1/16* (2006.01)

(52) U.S. Cl.
CPC ............ *F17C 1/00* (2013.01); *F15B 2201/42* (2013.01); *F16L 55/04* (2013.01); *F17C 2201/0104* (2013.01); *F17C 2203/0685* (2013.01); *F17C 2221/031* (2013.01); *F17C 2270/01* (2013.01)

(58) Field of Classification Search
USPC .............................................. 138/26, 30, 31
See application file for complete search history.

(56) References Cited

U.S. PATENT DOCUMENTS

| | | | | |
|---|---|---|---|---|
| 2,892,947 | A * | 6/1959 | Emanuelson | A61B 6/4429 138/31 |
| 3,672,402 | A * | 6/1972 | Bloemer | F15B 1/02 138/31 |
| 3,987,708 | A * | 10/1976 | Uhrich | B63C 11/52 92/134 |
| 6,234,352 | B1 * | 5/2001 | Richard | F17C 1/00 222/105 |
| 8,763,390 | B2 | 7/2014 | Bollinger et al. | |
| 8,806,866 | B2 | 8/2014 | Mcbride et al. | |
| 8,850,808 | B2 | 10/2014 | Ingersoll et al. | |
| 8,967,199 | B2 | 3/2015 | Blieske et al. | |
| 9,051,834 | B2 | 6/2015 | Ingersoll et al. | |
| 9,260,966 | B2 | 2/2016 | Ingersoll et al. | |
| 9,397,600 | B2 | 7/2016 | Fong et al. | |
| 9,444,378 | B2 | 9/2016 | Fong et al. | |
| 9,587,455 | B2 * | 3/2017 | Frey | E21B 33/064 |
| 2010/0329903 | A1 | 12/2010 | Fong et al. | |
| 2011/0247323 | A1 | 10/2011 | Kenway et al. | |

* cited by examiner

VARIABLE PRESSURE VESSEL

FIELD OF THE DISCLOSURE

This disclosure relates to variable pressure vessels and in particular variable pressure vessels that may be used in energy storage systems.

BACKGROUND

The compression of gases is a very important process in many technologies. When compressing or reducing the volume of an ideal or close to ideal gas, heat is produced in addition to an increase in the gas pressure. When the heat produced due to gas compression is removed from the compressing gas by, for example, heat exchange with the surroundings, the process is isothermal.

The expansion of a gas is a process opposite to the process of compression. During the expansion, the gas pressure is decreased and heat is consumed by the expanding gas. In order to achieve isothermal conditions, the amount of heat consumed by the expanding gas is supplied, for example, by heat transfer from the surroundings to the expanding gas.

Gas compression/expansion is commonly used for the storage of energy in compressed air energy storage systems (CAES), the isothermal regime allows the energy loss to be minimized, and therefore, maximizes the overall storage efficiency.

True or theoretical isothermal compression/expansion is difficult if not impossible in actual practice. To achieve true or theoretical isothermal expansion/compression there is a requirement for a zero temperature difference between the compressed/expanded gas and the surroundings. That requires either an infinite heat transfer area, or infinite heat transfer time or both. The real compression/expansion processes can approach the theoretical isothermal compression/expansion to varying degrees. The term pseudo isothermal compression is used here to describe a compression which is between isentropic and truly isothermal. In pseudo isothermal compression some heat is removed from the compressed gas, but it is less than the amount of heat to be removed for truly isothermal compression.

Recently, a process and apparatus for the pseudo isothermal compression and expansion of a gas was disclosed in PCT Applications PCT/CA2013/050972 and PCT/CA2015/050137. The prior art references show processes for compression and expansion that are based on the use of a liquid, which is pumped into a gas/liquid compression device and pushed out from a gas/liquid expansion device. The liquid plays the role of a "liquid piston". In the prior art reference the liquid and the compressed/expanded gas are in direct contact, i.e. there is a gas-liquid interface. In these disclosures, the heat is transferred from the compressing gas to the surroundings by one or any combination of the following mechanisms. The heat is transferred directly from the compressing gas through the walls of the compression device to the surroundings. The heat is transferred indirectly first from the gas to the liquid piston through their interface and then from the liquid to the surroundings. The heat is transferred indirectly first from the gas to a solid heat sink, then from the solid heat sink to the liquid, and finally from the liquid to the surroundings. Further, the heat transfer mechanisms are the same during expansion, but the heat travels in the opposite direction (from the surroundings towards the expanding gas).

As stated above, in the prior art references there is direct gas-liquid contact. The existence of a liquid surface, contacting the gas, leads to several problems. Some of these problems are listed below. The dissolution of the gas in the liquid (during the increase in the gas pressure), followed by a release of the dissolved gas from the liquid and formation of gas bubbles (during the decrease in the gas pressure), results in a decrease of each of the compression and expansion efficiency. The loss of part of the liquid (forming the liquid piston) from the compression/expansion device together with the gas exiting the compression/expansion device due to (but not limited to) the motion of the liquid in the compression/expansion vessel when waves and other types of motion of the liquid surface are formed; and the foaming of the liquid. This results in the decrease of the compression/expansion efficiency, and also in the loss of liquid from the compression/expansion device, when a part of the liquid is expelled from the compression/expansion device together with the compressed or expanded gas. The foaming can be a result of two main processes: entrainment of gas bubbles in the liquid through the gas-liquid interface; and formation of gas bubbles when the dissolved gas is released from the liquid due to the pressure decrease and/or temperature increase. This process is similar to the formation of gas (carbon dioxide) bubbles in a carbonated drink when a bottle is opened and the pressure above the drink is decreased.

Accordingly it would be advantageous to provide a variable pressure vessel that provides an improved heat transfer mechanism.

SUMMARY

The present disclosure relates to a variable pressure vessel. The vessel includes a liquid chamber and a gas chamber and a moveable barrier therebetween. The vessel has a volume, a first stroke, and a second stroke. The liquid chamber and the gas chamber each have a variable volume that changes responsive to the first stroke and the second stroke. The gas chamber has an outer wall wherein at least a portion of the outer wall is thermally conductive and allows heat to transfer therethrough. Movement of the moveable barrier between the liquid chamber and the gas chamber causes the volume in the liquid chamber and the volume in the gas chamber to displace each other. The volume in the gas chamber plus the volume in the liquid chamber is generally constant and generally equals the volume in the variable pressure vessel.

The moveable barrier may have a surface area that may be generally constant responsive to the first stroke and the second stroke. The moveable barrier may be a bladder. The moveable barrier may be flexible. The moveable barrier may be a polymer bag.

The gas chamber may be defined by a plate and the moveable barrier. The plate may have a high heat conductivity. The plate may be a metal, metal alloy, carbon composite plate.

The air chamber may be defined by an inner tube and a flexible outer bladder. The moveable barrier may be a bellows. The bellow may include a bellows element located on an inside of the bellows to occupy a central portion of the bellows when the bellows are completely collapsed.

The moveable barrier may be a plurality of bladders. The moveable barrier may be an elongate snake-like flexible tube.

The pressure vessel may be defined by walls, the gas chamber may be defined at least in part by the moveable barrier and the liquid chamber may be the volume between the gas chamber and the walls of the pressure vessel.

The gas chamber may be defined by a plate and the moveable barrier. The plate may be a metal, metal alloy or carbon composite plate.

The gas chamber may be defined by an inner hollow cylindrical tube and a moveable barrier. The moveable barrier may be on the outside of the inner hollow cylindrical tube. The moveable barrier may be on the inside of the inner hollow cylindrical tube.

The inner hollow cylindrical tube defines an inner volume and the inner volume may be in flow communication with the liquid chamber and forms part of the liquid chamber.

The inner hollow cylindrical tube defines an inner volume and the inner volume may be in flow communication with an inlet and an outlet that may be external to the pressure vessel. The inner volume of the inner hollow cylindrical tube may be filled with heat transfer fluid.

The inner hollow cylindrical tube may be made of metal, metal alloy or carbon composite.

The variable pressure vessel may be a generally cylindrical vessel. The pressure vessel may be defined by walls, the gas chamber may be defined at least in part by the moveable barrier and the gas chamber may be the volume between the liquid chamber and the walls of the pressure vessel.

The variable pressure vessel may be a generally cylindrical vessel and the moveable barrier may be a generally tubular balder attached at each end thereof to the generally cylindrical vessel and the gas chamber may be defined by the generally tubular bladder and the generally cylindrical vessel.

The liquid chamber and the gas chamber has an interface therebetween and the value of the heat transfer coefficient of the interface can be calculated $$K=[p_1 V_1 A\Delta T/\delta t_{stroke})] \ln(p_1/p_2)$$

and in the process of gas compression $p_1$ is the initial gas pressure, $p_2$ is the final gas pressure after compression, A is the surface of the heat transfer, $\Delta T$ is the difference between the initial and the final temperature, $t_{stroke}$ is the time of the compression stroke, V1 is the gas volume at the start of the compression stroke, $\delta$ is the wall thickness, and in the process of gas expansion $V_1$ is the gas volume at the end of the expansion cycle, $p_1$ is the gas pressure at the beginning of the gas expansion, $p_2$ is the final gas pressure at the end of the expansion and the heat transfer coefficient of the material for the interface is greater than or equal to the calculated K.

Further features will be described or will become apparent in the course of the following detailed description.

BRIEF DESCRIPTION OF THE DRAWINGS

The embodiments will now be described by way of example only, with reference to the accompanying drawings, in which.

DETAILED DESCRIPTION

When a gas is compressed (i.e. its volume is decreased), the pressure of the gas rises and heat is produced. When a gas is expanded (i.e. its volume is increased), the pressure of the gas decreases while the gas consumes heat. One of the ways to compress and expand gases at a theoretical 100% efficiency is by compressing and expanding the gas isothermally. In isothermal compression and expansion the heat produced during compression and the heat consumed by the gas during expansion is completely and simultaneously transferred to (during compression) and from (during expansion) the surroundings. Therefore during isothermal compression or expansion, the temperature of the compressing or expanding gas remains constant during the process of compression or expansion.

This disclosure is aimed at reducing the negative effects of the direct contact of the compressed/expanded gas with the liquid (of the liquid piston) used to compress or expand the gas.

This disclosure is based on the use of an enclosure or vessel, having a variable volume, separating the compressing/expanding liquid (the liquid piston) from the gas being compressed or expanded. The walls (and in addition possibly some filling elements and/or inside and/or outside fins) of the variable volume (collapsible) enclosure are used for the transfer of heat between the compressing or expanding gas and the liquid of the liquid piston.

Figure 1:
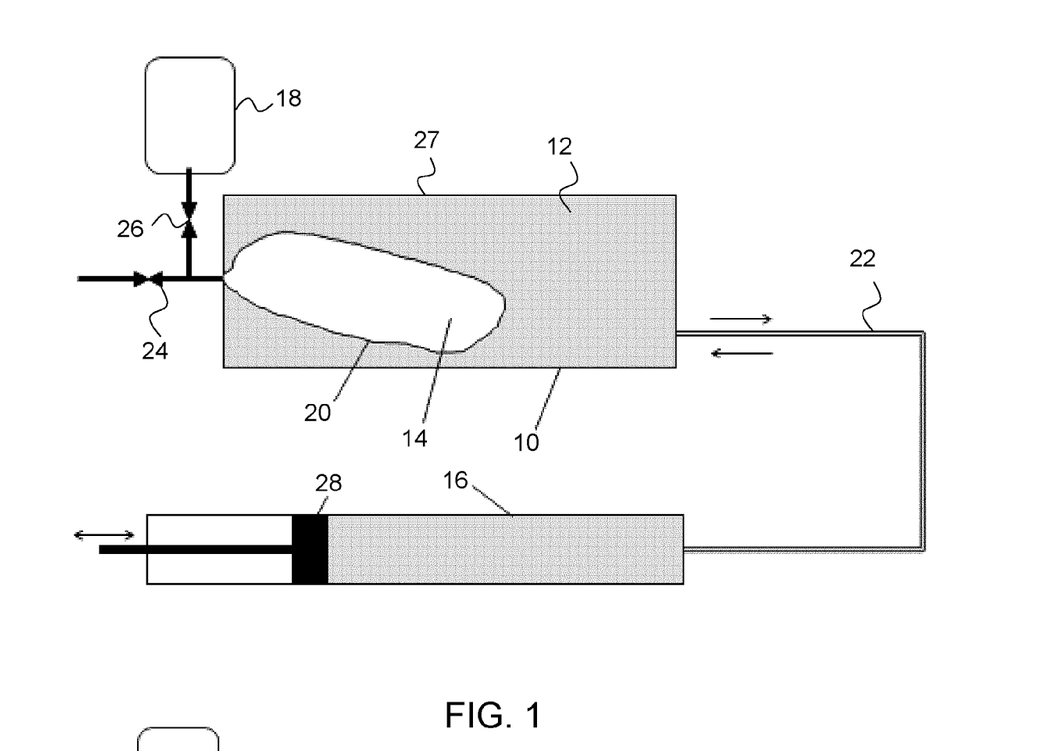
FIG. 1 is a schematic diagram of a variable pressure vessel showing gas inside a variable volume enclosure and liquid outside the variable volume enclosure and attached to a pump.

Referring to FIG. 1 a variable pressure vessel is shown generally at 10. The variable compression vessel 10 is used for compression and or expansion. The variable pressure vessel includes a liquid chamber 12 and a gas chamber 14. The liquid chamber 12 is in flow communication with a hydraulic cylinder 16 or another type of pump device. There is a moveable barrier between the liquid chamber 12 and the gas chamber 14. There are a number of possible different configurations for the variable pressure vessel 10. The variable pressure vessel 10 has a first stroke and a second stroke. During the first stroke liquid is drawn from the liquid chamber 12 and air is drawn into the air chamber or gas chamber 14. During the second stroke air is pushed out of the air chamber 14 into a receiving tank 18. It will be appreciated by those skilled in the art that the process described herein is a two stroke process wherein one stroke is a compression stroke and the other is an expansion stroke. Following the generic terms first and second stroke and the mores specific compression and expansion stroke will be used depending on the context.

In the configuration shown in FIG. 1, a flexible (variable volume) enclosure 20 is surrounded by a liquid (the liquid piston) in the liquid chamber 12. The flexible enclosure 20 is the moveable barrier between the liquid chamber 12 and the gas chamber 14. The flexible enclosure 20 may be a plastic bag or any other type of polymer bag. The flexible enclosure 20 should be chemically stable towards gas and liquid and it should be flexible enough such that when squeezed most of the air can be expelled or evacuated. The flexible enclosure 20 defines the air chamber 14. The liquid chamber 12 is volume between the walls 27 of the variable pressure vessel 10 and the flexible enclosure 20. In the process of gas compression, during the first stroke, when the liquid is being retracted from the liquid chamber 12 in the variable pressure vessel 10 through the connection 22, the flexible enclosure 20 which is the gas chamber 14 is filled with a low pressure gas through a valve 24 (which may be a check valve).

When the variable pressure vessel 10 is used for gas expansion, a certain amount of compressed gas is introduced to the air chamber and the air chamber, due to its expansion, displaces the liquid from the liquid chamber 12. The liquid flowing out of the liquid chamber 12 is used to create mechanical energy in a separate, reciprocal (for example, hydraulic cylinder) 16 or rotational (for example, liquid motor) unit (not shown).

The heat produced by the compressing gas during compression and consumed by the expanding gas during expansion is transferred to/from the liquid in the liquid chamber 12 or to the surroundings outside the variable compression vessel 10.

In the case of gas compression, during the first stroke the valve 26, which is between the receiving tank 18 and the gas chamber 14, is closed while the valve 24 is open. In the next step or second stroke the liquid is pushed back into the liquid chamber 12 of the variable pressure vessel 10 though the connection 22, thus increasing the pressure of the gas inside air chamber 14. When the pressure in the air chamber 14 becomes close to the pressure in the receiving gas tank 18, the valve 26 (which may be a check valve) opens and the compressed gas fills the tank 18. During that stroke, valve 24 is closed. Then the process of gas compression is repeated by starting the step one or the first stroke, and following with the step two or the second stroke.

The hydraulic cylinder 16 includes a reciprocating piston 28 which moves inwardly and outwardly. The hydraulic cylinder 16 or another type of pump device is used to pump the liquid into the liquid chamber 12 of the variable pressure vessel 10 though the connection 22 during compression stroke and to receive the liquid from the liquid chamber 12 during retraction stroke.

The process of gas expansion is similar to the process of gas compression. During the process of expansion, in the first step or first stroke a certain amount of compressed gas from the compressed gas tank 18 is introduced to the flexible enclosure 20 via valve 26. Valve 24 is closed at that time. By way of example, the volume of the compressed gas introduced to the variable volume enclosure 20 (the bag) may be chosen so that the pressure in the variable volume enclosure 20 will reach close to the desired final pressure at the end of the expansion stroke. The compressed air pushes the liquid out of the liquid chamber 12, thus creating a mechanical energy of the flowing liquid out of the connection 22 and into the hydraulic cylinder 16. In the second step or second stroke, the liquid is pumped into the liquid chamber 14 through the connection 22, pushing out the expanded gas through the valve 24; the valve 26 is closed. Then the first and the second strokes are repeated. Thus the variable pressure vessel described herein can be used in an energy storage system.

Figure 2:
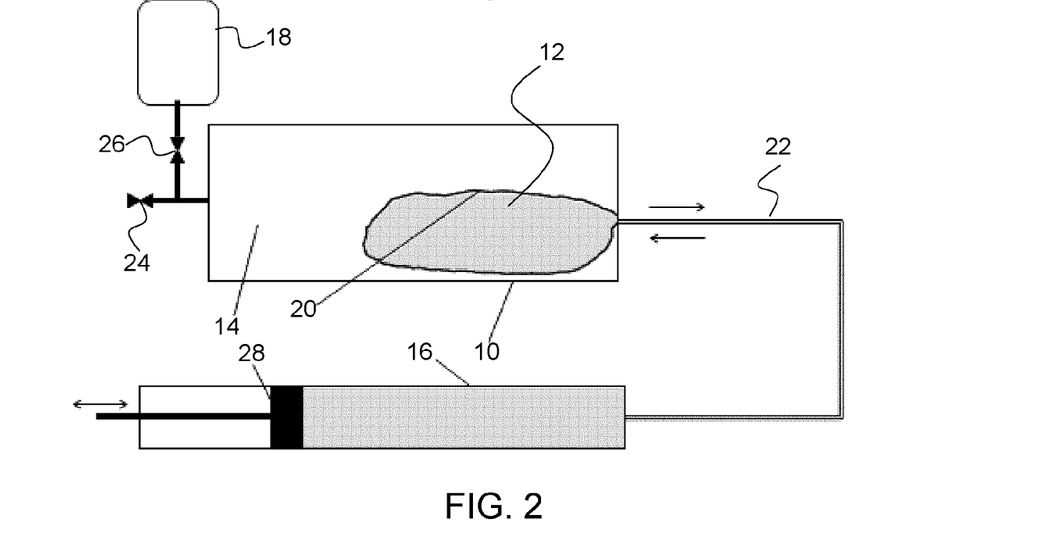
FIG. 2 is a schematic diagram of a variable pressure vessel similar to that shown in FIG. 1 but showing liquid inside a variable volume enclosure and gas outside the variable volume enclosure.

FIG. 2 is similar to that shown in FIG. 1 but the flexible enclosure 20 is the liquid chamber 12 and the air chamber 14 is defined by the volume between the flexible enclosure 20 and the walls 27 of the variable pressure vessel 10. The steps or strokes are the same as described above in relation to FIG. 1. In the case of gas compression, at the end of the compression stroke (step 1), most or all of the gas outside of the flexible enclosure 20 is pushed to the receiving tank or vessel 18, so almost no gas remains in the air chamber 14 outside of the flexible enclosure 20.

Preferably the interface between the air chamber 14 and the liquid chamber 12 has a large surface area and the material or materials of the interface have a high thermal conductivity. The large surface area and the high thermal conductivity facilitate the heat transfer through the enclosure walls. The surface area of the interface may be increased in different ways, some of which are shown in FIGS. 3-6 and are by way of example only. Other possible interfaces are shown in FIGS. 7 to 17 and are by way of example only.

Figure 3:
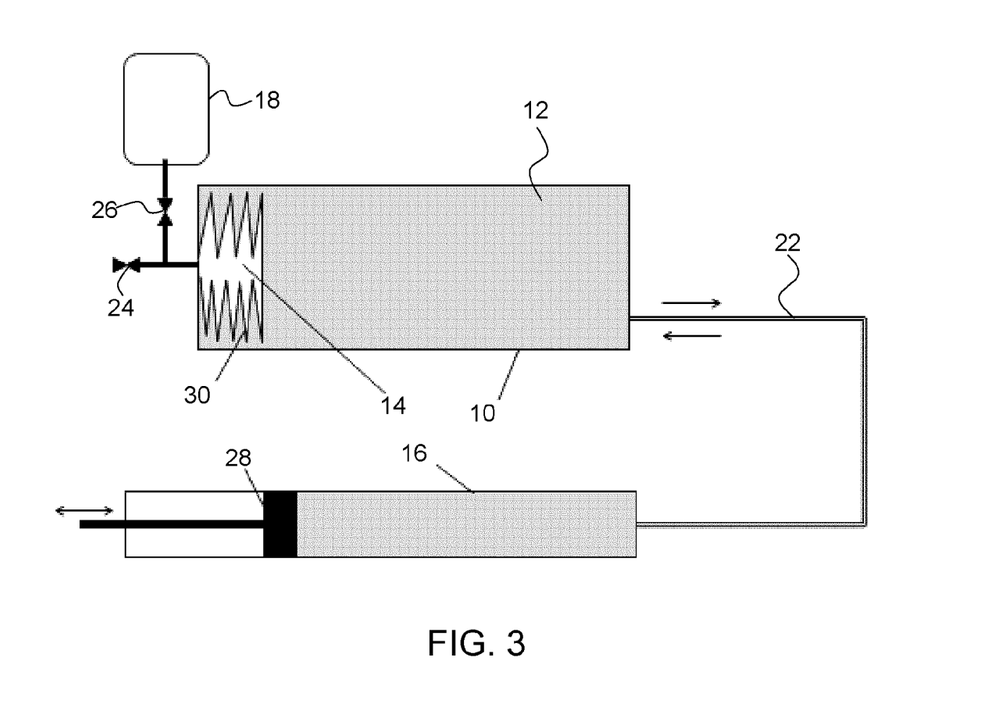
FIG. 3 is a schematic diagram of a variable pressure vessel similar to that shown in FIG. 1 but showing the variable volume enclosure as a bellows.
Figure 4:
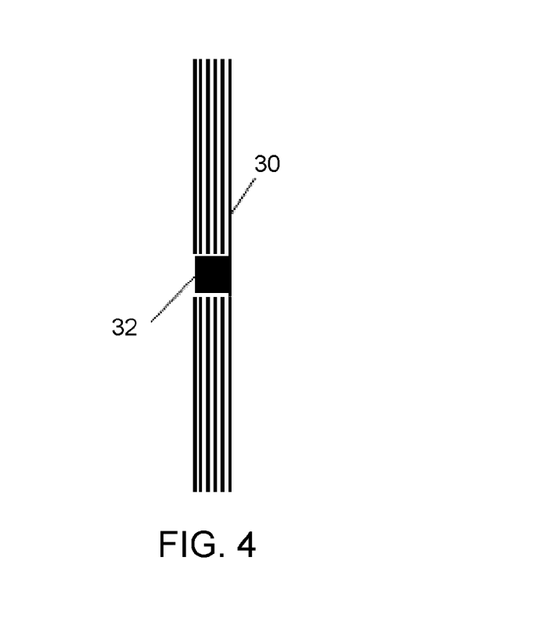
FIG. 4 is a schematic diagram of the bellows similar to that shown in FIG. 3 but showing completely squeezed bellows and an element in the central part of the bellows.

FIG. 3 shows an embodiment when the enclosure 30 has a shape of a bellows. The bellows 30 is designed so that at the end of the compression cycle (or at the beginning of the expansion cycle) the volume of the gas inside of the bellows is minimal. An example of such a design is shown in FIG. 4. In this embodiment an element 32 occupies the volume at the central part of the completely squeezed bellows 30, thus reducing the amount of gas left in the bellows 30 at the end of the compression cycle as well at the beginning of the expansion cycle.

Figure 5:
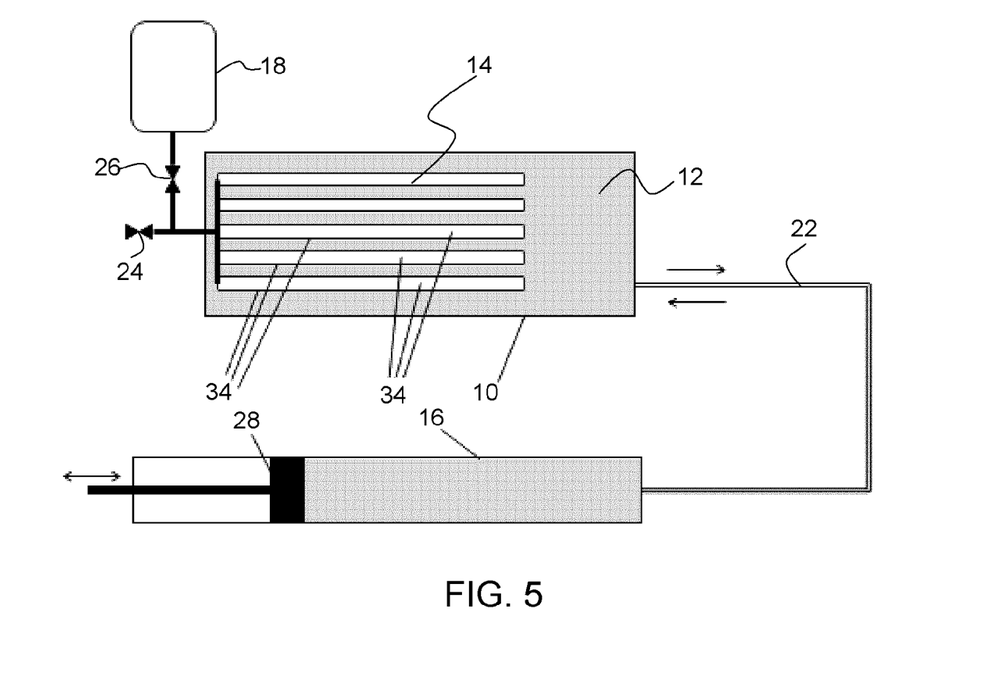
FIG. 5 is a schematic diagram similar to that shown in FIG. 1 but showing a plurality of variable volume enclosures in flow connection.

FIG. 5 shows the enclosure in the form of a plurality of interconnected flexible bags 34 connected in parallel to each other. As can be seen the advantage of this embodiment is that it increases the surface area. The increased surface area can provide better heat transfer. However, the disadvantage with this embodiment is that it is harder to completely evacuate air from the air chamber 14.

Figure 6:
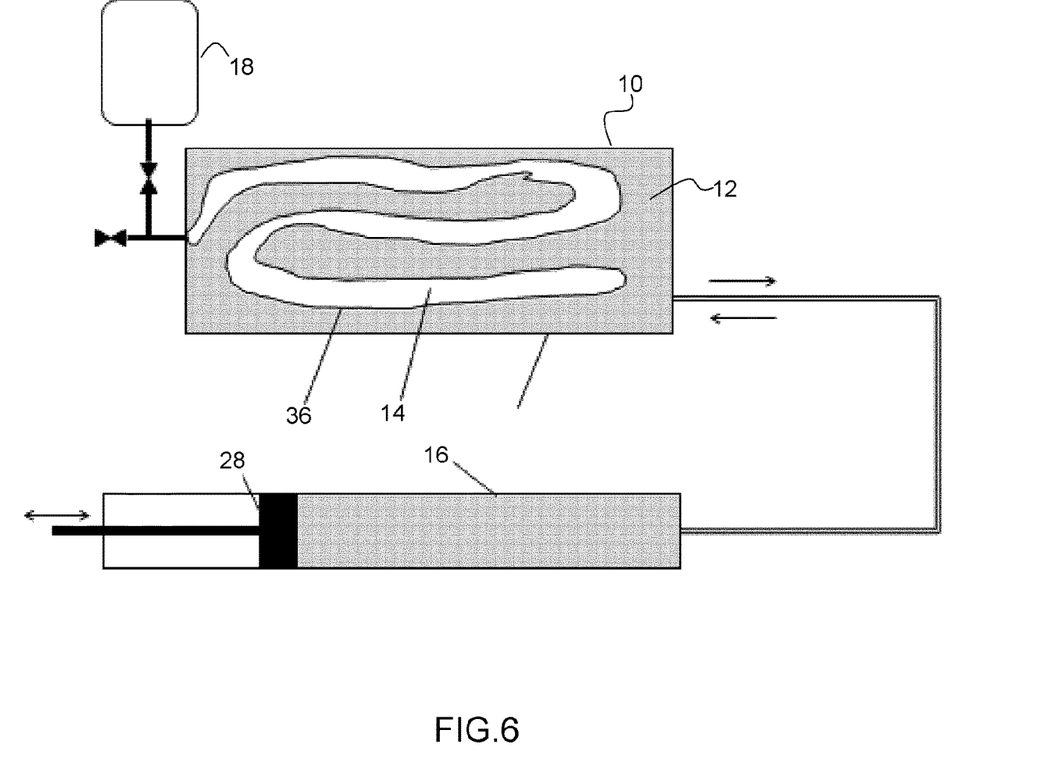
FIG. 6 is a schematic diagram similar to that shown in FIG. 1 but showing an alternate embodiment to the variable volume enclosure that is an elongate flexible tube.

FIG. 6 shows an embodiment when the enclosure is a snake-like long flexible tube 36, fitted in the variable pressure vessel 10 similarly to the intestines in an animal stomach. The surface of the tube 36 may be smooth or not. As discussed above, one of the most important conditions for the enclosure design is the complete or close to complete removal of gas at the end of the compression cycle or at the beginning of the expansion cycle.

As discussed above prior art patent applications PCT/CA2013/050972 and PCT/CA2015/050137 disclosed compressed air energy storage systems, based on the compression of air by hydraulic fluid moving from a pump or a hydraulic cylinder to a compression vessel. It will be appreciated by those skilled in the art that the same system can be used also for the gas (air) expansion when the compressed gas injected in the expansion unit, expands and moves hydraulic liquid from the expansion unit into the hydraulic cylinder(s). The prior art disclosed a mechanical converter of the rotational motion of the electrical motor/generator to reciprocal motion of the hydraulic cylinder. Alternatively, the rotational motor/generator and the converter can be replaced by a linear electrical motor, driving the hydraulic cylinder. One of the most important elements of the compression/expansion system is the unit for the simultaneous compression/expansion and heat transfer or the compression vessel. These two PCT applications disclose a multistage liquid piston compression or expansion vessel, which can be used in the present application. In addition these two PCT applications disclose a combined hydraulic cylinder and a compression/expansion vessel, both enclosed in a single cylindrical vessel. That feature also can be used in the present application.

Figure 7:
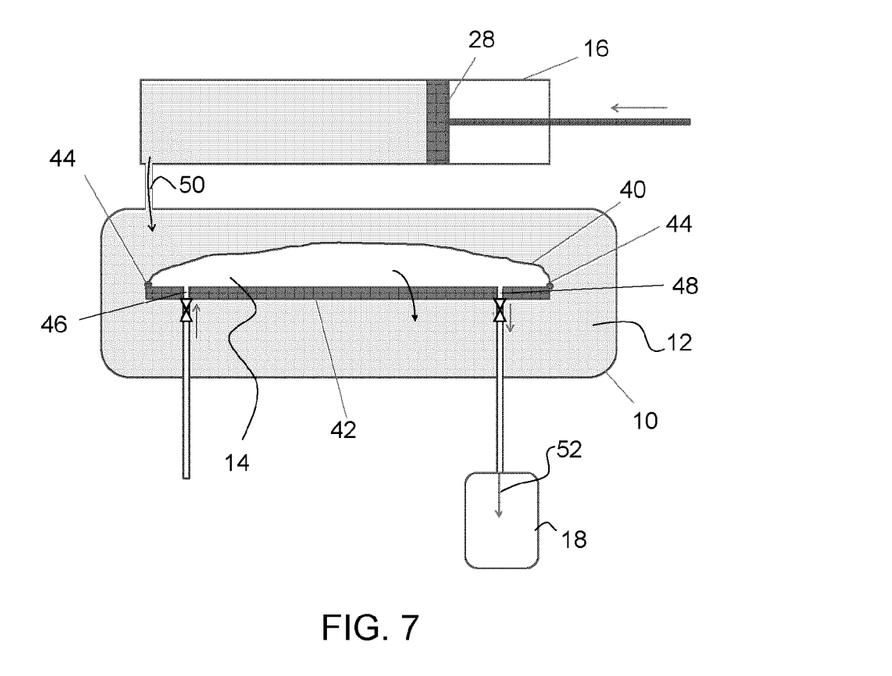
FIG. 7 is a schematic diagram similar to that shown in FIG. 1 but showing the variable volume enclosure as a heat conducting plate and a flexible bladder and showing the pump in a compression stroke.
Figure 8:
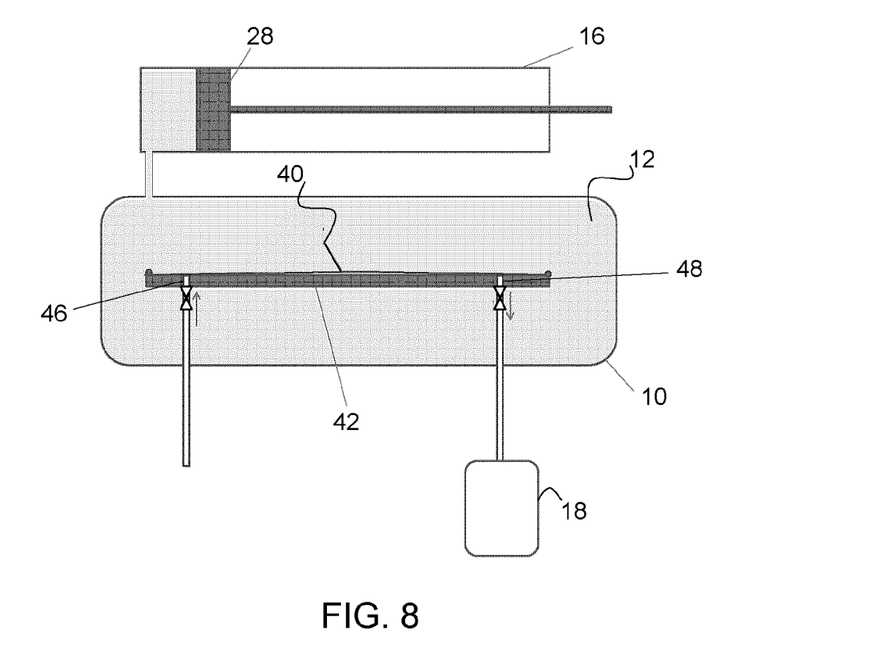
FIG. 8 is a schematic diagram similar to that shown in FIG. 7 but showing the pump generally fully compressed.
Figure 9:
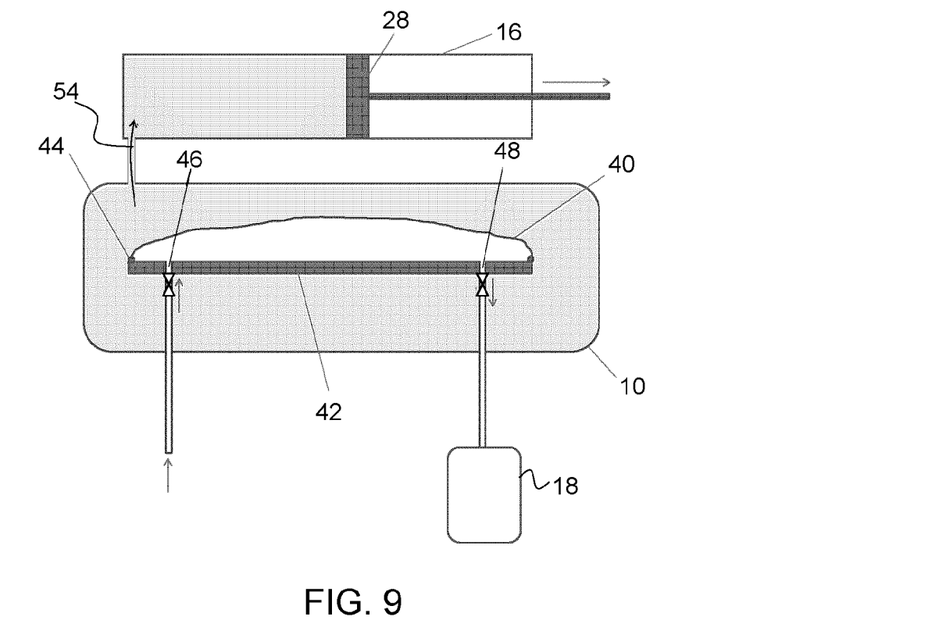
FIG. 9 is a schematic diagram similar to that shown in FIGS. 7 and 8 but showing the pump in an expansion stroke.

An alternate embodiment of a variable compression vessel 10 is shown in FIGS. 7 to 9. The different stages of the compression/expansion cycle are shown in FIGS. 7 to 9.

An important property of the flexible enclosure 20 is its flexibility, in the embodiment shown in FIGS. 1 to 6, the flexible enclosure 20, flexible bag 34, flexible bellow 30 and flexible tube 36 may be made from plastic or rubber. The value of the heat transfer coefficient of the wall separating the gas and the liquid chambers, can be approximately calculated as:

$$K=[p_1 V_1 A \Delta T/\delta t_{stroke})] \ln(p_1/p_2) \qquad (1)$$

Where in the process of gas compression $p_1$ is the initial gas pressure, $p_2$ is the final gas pressure after compression, A is the surface of the heat transfer, $\Delta T$ is the difference between the initial and the final temperature, $t_{stroke}$ is the time of the compression stroke, V1 is the gas volume at the start of the compression stroke, $\delta$ is the wall thickness.

In the process of gas expansion $V_1$ is the gas volume at the end of the expansion cycle, $p_1$ is the gas pressure at the beginning of the gas expansion, $p_2$ is the final gas pressure at the end of the expansion. The rest of the symbols are the same as in the process of compression. The absolute value of the constant K for the material of the barrier should be greater than or equal to the calculated K.

It will be appreciated by those skilled in the art that for materials such as polymers which have low heat transfer coefficient by using a very small $\delta$ wall thickness one can achieve good heat transfer through the moveable barrier. Alternatively for the materials such as metal, metal alloys or metal or carbon composites larger $\delta$ wall thickness may be used.

It will be appreciated by those skilled in the art that polymer materials have lower heat conductivity than other materials. Usually materials having higher heat conductivity, such as metals, metal or carbon composites or metal alloys are less flexible. Accordingly a flexible enclosure that uses both materials may be optimal. FIGS. 7 to 17 show embodiments wherein at least part of the interface between the gas and the liquid or between the gas and the surroundings is made of high heat-conducting substance. The high heat conducting substance may be a metal or another substance having high thermal conductivity.

FIGS. 7 to 9 shows an example of such a solution, where the gas chamber 14 and the liquid 12 are separated by a two-piece separator, consisting of a flexible bladder 40 which usually have a lower heat conductivity and a not very flexible, but highly heat-conductive wall 42. The bladder 40 and the wall 42 are connected by a gas-tight connection 44.

FIGS. 7 to 9 show the different stages of gas compression. FIG. 7 shows specifically the compression stage of the gas compression. The check valve 46 is closed at that stage. At the beginning of the first stage, the check valve 48 is also closed. The piston 28 of the hydraulic cylinder 16 retracts (moves towards the left in the picture). It causes the hydraulic fluid (liquid) in the cylinder 16 to move towards the variable compression vessel 10 (the motion of fluid is shown by the arrow 50). The increase of the volume of liquid in the liquid chamber 12 causes a shrinkage of the bladder 40, resulting in the compression of the gas in the gas chamber 14. Once the pressure of the gas becomes close to the pressure in the compressed air storage vessel 18, the check valve 48 opens, allowing compressed air to enter the vessel 18 (shown by the arrow 52). The total volume of liquid is chosen so that the bladder 40 is almost completely shrunk (expels almost all the gas into the vessel 18) at the time when the piston 28 is fully retracted. That point (complete piston retraction) is shown in FIG. 8.

Once the piston 28 is fully retracted (reaches its left limit shown in FIG. 8), almost all of the gas is transferred to the vessel 18, and the check valve 48 closes. Following this point, the piston 28 reverses its direction of motion and starts extending (moving to the right) as shown in FIG. 9. At that stage, the check valve 46 opens; the check valve 48 is closed. The volume of liquid leaving the liquid chamber 12 (following the arrow 54), is replaced by a fresh gas, entering the bladder 40 via the check valve 46. The process of fresh gas input continues until the piston 28 reaches its full extension (the right-side limit). After that, the piston starts retracting again and the compression cycle repeats by returning to the first stage (represented by FIG. 7).

It will be appreciated by those skilled in the art that check valves 48 and 46 are by way of example only and other valves may also be used such as solenoid ones.

The gas expansion can be performed using the same unit shown in FIGS. 7 to 9. However, the valves 48 and 46 during the expansion are not check-valves, but controllable valves such as solenoids. The first step or expansion is the addition of a certain amount of compressed gas from the compressed gas storage vessel 18 to the bladder 40. Just at the beginning of the retraction of the piston 28 (FIG. 9), the valve 48 is opened for such an amount of time that a pre-determined amount of compressed gas enters the bladder 40. The amount of the compressed gas is disclosed in PCT/CA2013/050972 and PCT/CA2015/050137. The compressed gas pushes the liquid from the liquid chamber 12 towards the cylinder 16 (arrow 56), thus moving (extending) the piston 28, creating a mechanical motion. Once the piston is fully extended, it stats retracting (FIG. 7). At the beginning of retraction, the valve 46 is opened and the expanded gas is being pushed out of the bladder 40. The valve 46 remains open and the valve 48 remains closed during the entire retraction cycle of the piston 28 (until it reaches its left limit). Then the expansion cycle repeats by the piston starting to extend and valve 46 briefly opening to add a certain amount of compressed gas to the bladder, as described above.

Figure 10:
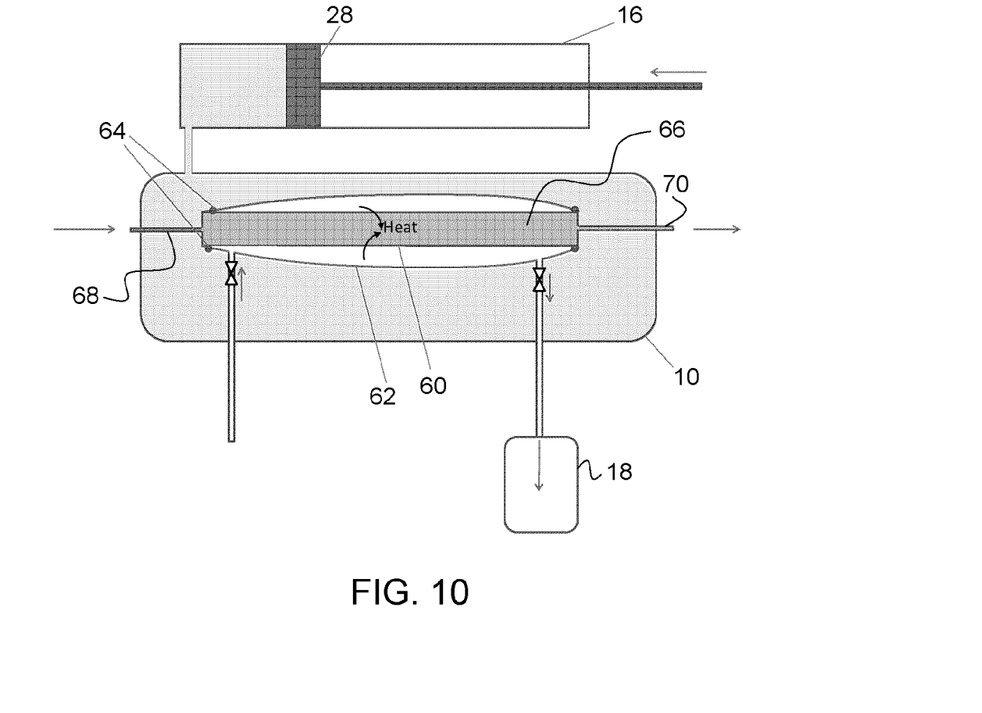
FIG. 10 is a schematic diagram similar to that shown in FIG. 6 but showing an inner hollow tube and an outer sleeve and the inner tube is filled with heat transfer fluid and is in flow communication with an inlet and outlet external to the variable pressure vessel.

An alternate embodiment of a variable compression vessel 10 is shown in FIG. 10. Here, the high heat conducting material has the shape of a tube 60 with circular, rectangular or other cross-section. The tube 60 is surrounded by a sleeve of the flexible bladder 62. The tube and the bladder are connected gas-tightly by the connections 64. The three stages of gas compression explained above with reference to FIGS. 7 to 9 are similar here. The heat is transferred between the compressing (or expanding) gas and the fluid 66 in the interior volume of the tube 60 through the walls of the tube 60. Fluid 66 may be gas or liquid. The inner volume of the tube 60 is separated from the liquid in the liquid chamber 12. The heat transfer fluid 66 enters via the connection 68 and leaves via the connection 70. The process of expansion, carried out in the unit shown in FIG. 10, follows the stages described above.

Figure 11:
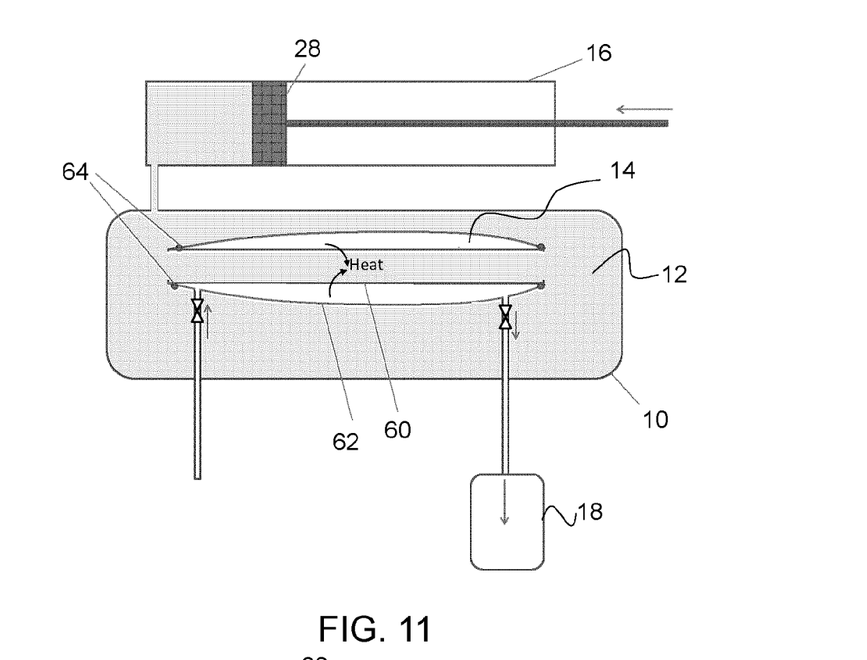
FIG. 11 is a schematic diagram similar to that shown in FIG. 10 but showing the inner tube in flow communication with the liquid.

FIG. 11 shows a modification of the variable compression vessel shown in FIG. 10. In FIG. 11 both ends of the heat transfer inner tube 60 are open, and the tube 60 is filled with the liquid from the liquid chamber 12. Therefore, the heat is transferred between the gas in the gas chamber 14 and the liquid in the liquid chamber 12.

Figure 12:
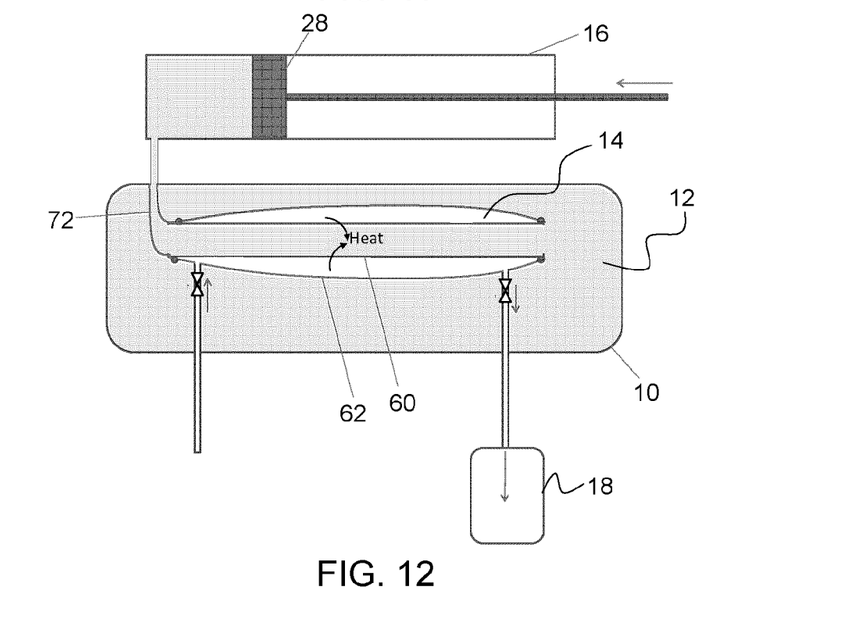
FIG. 12 is a schematic diagram similar to that shown in FIG. 11 but further including a connection with the pump such that the liquid from the pump is in direct flow communication with the inner tube.

FIG. 12 shows a further modification of the variable compression vessel shown in FIG. 11. In this embodiment the hydraulic cylinder 16 is connected to the inner tube 60 with connector 72. The liquid in the inner tube 60 then is in flow communication with the liquid in the liquid chamber 12. This embodiment will provide different heat transfer characteristics than those of the embodiments shown in FIGS. 10 and 11.

Figure 13:
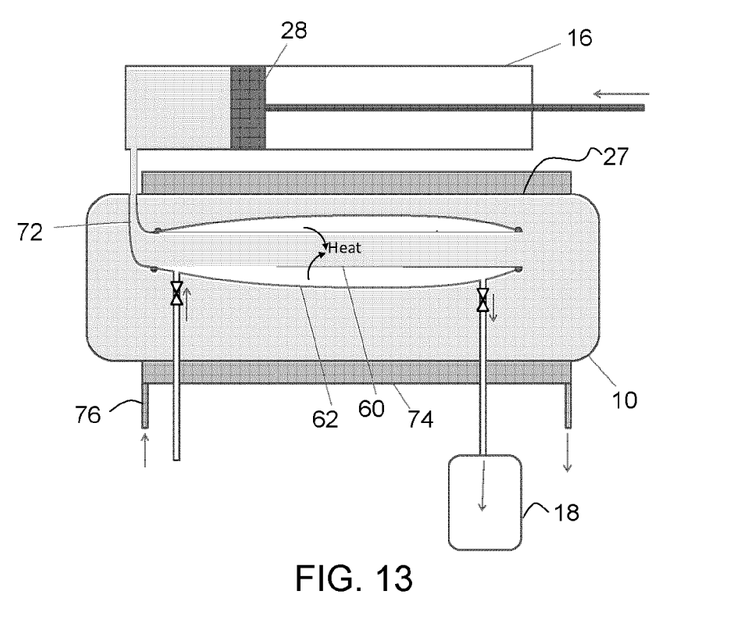
FIG. 13 is a schematic diagram similar to that shown in FIG. 12 but further including a fluid jacket for the variable pressure vessel.
Figure 14:
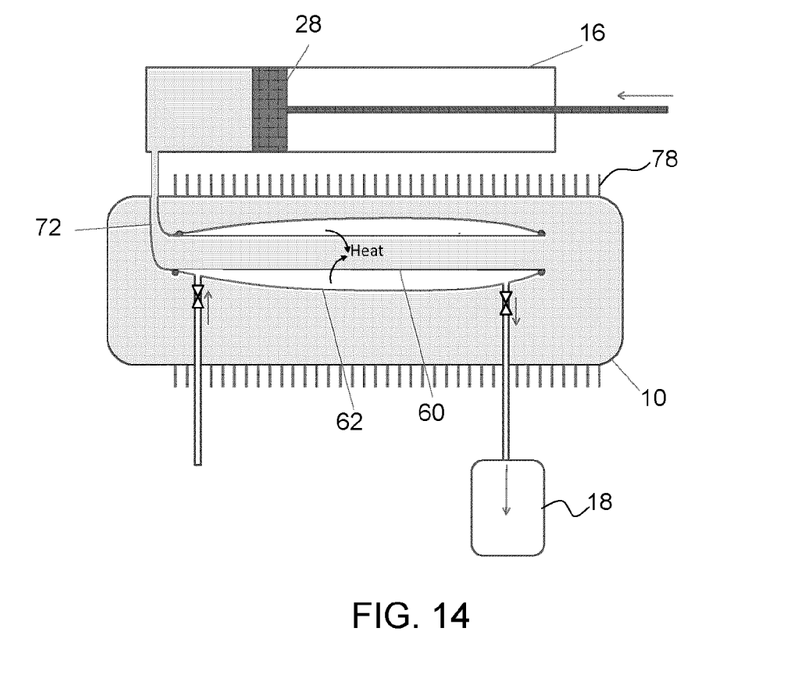
FIG. 14 is a schematic diagram similar to that shown in FIG. 12 but further including heating and cooling fins.

As discussed above, since the liquid is heated (during compression) or cooled (during expansion), heat is removed (during compression) or added (during expansion). The ideal is to maintain a generally constant temperature of the liquid in the liquid chamber 12 during both compression and expansion. As discussed above there will be heat transfer between the gas in the gas chamber 14 and the liquid in the liquid chamber 12. There will also be heat transfer between the liquid and/or gas in the variable compression vessel 10 through its wall 27 to the atmosphere. FIGS. 13 and 14 show two possible ways of improving the heat transfer through the walls 27. FIG. 13 shows the removal or addition of heat from/to liquid in the liquid chamber 12 through the walls 27 of the variable pressure vessel 10 by using a jacket 74, cooled or heated by a fluid 76. FIG. 14 shows an embodiment wherein the walls 27 of the variable pressure vessel 10 contain fins 78 or similar elements which facilitate a better transfer of heat to/from the surrounding atmosphere.

Figure 15:
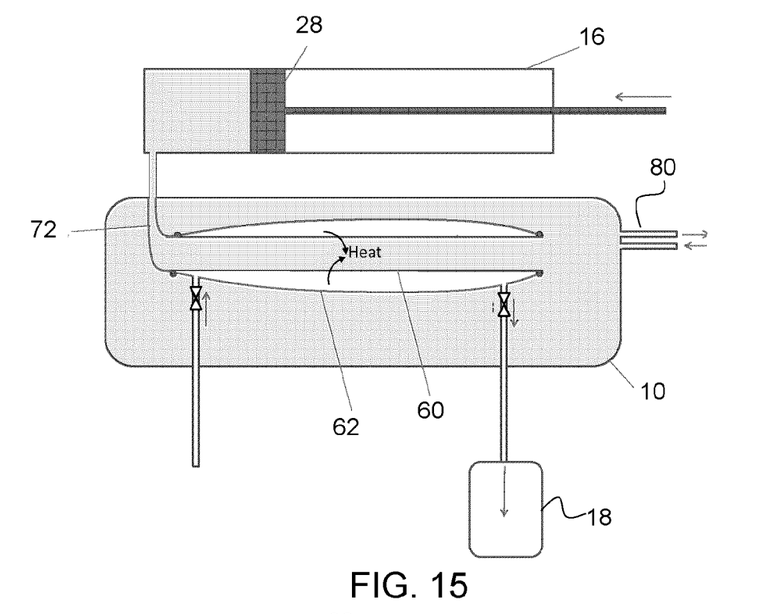
FIG. 15 is a schematic diagram similar to that shown in FIG. 12 but further including a liquid outlet.

FIG. 15 shows an embodiment wherein the liquid in the liquid chamber 12 is withdrawn/added periodically to/from the port 80 directed to an external heat transfer unit (not shown). The amount of liquid withdrawn and added through the port 80 should be generally the same. It is preferable to add/withdraw liquid through the port 80 during the extension of the piston (when the unit is used for gas compression) or during the retraction (when the unit is used for gas expansion), when the pressure of the liquid in the liquid chamber 12 is low.

Figure 16:
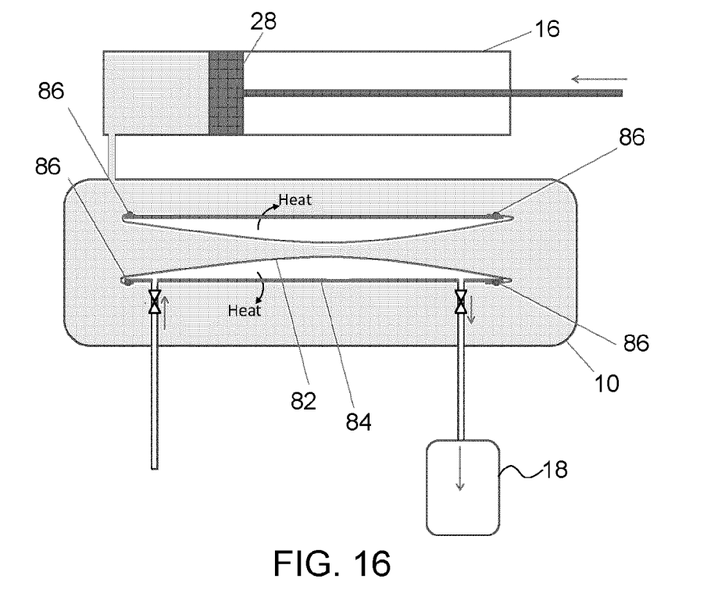
FIG. 16 is a schematic diagram similar to that shown in FIG. 10 but showing an outer hollow tube and an inner sleeve.

Another embodiment of the combination of the flexible bladder 82 and the heat transfer tube or element 84 is shown in FIG. 16. A tube 84 is used as a heat transfer element as in embodiments of FIGS. 10 to 15. The heat is also transferred between the gas in the gas chamber 14 and the liquid in the liquid chamber 12. However, the flexible bladder 82 in the form of a flexible tube is located inside the heat transfer tube 84. The bladder 82 and heat transfer tube 84 are connected gas-tightly via the connections 86.

It will be appreciated by those skilled in the art that the air chamber 14 may have any shape. The air chamber 14 withstands pressure higher than the highest pressure of the compressing gas (during compression), or higher than the initial pressure of the expanding gas (during expansion).

Figure 17:
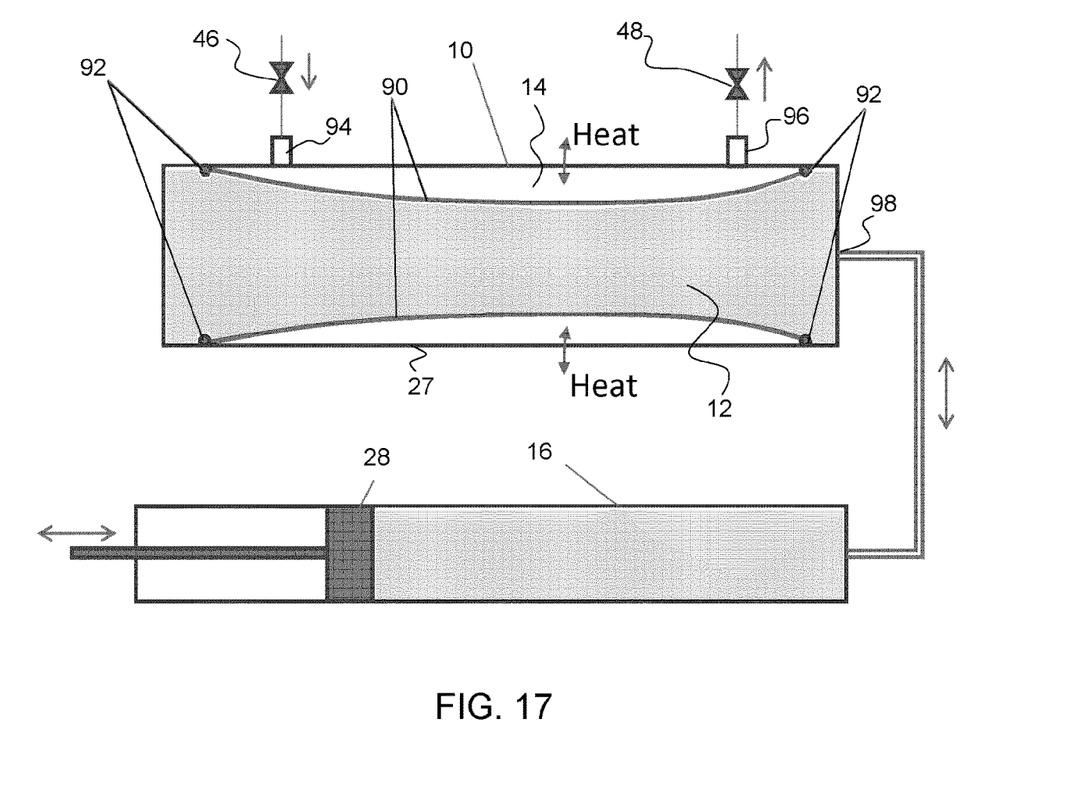
FIG. 17 is a schematic diagram similar to that shown in FIG. 1 but showing the variable volume enclosure filled with air defined by a flexible barrier and the walls of the variable pressure vessel.

In the embodiment shown in FIG. 17, the gas chamber 14 is defined by a flexible bladder 90 and the walls 27 of the variable compression vessel 10. Bladder 90 is used to separate the compressing/expanding gas in the gas chamber 14 from the hydraulic liquid in the liquid chamber 12. The bladder 90 is attached to the inner wall 27 of the variable compression vessel 10 using attachments 92. The attachments 92 between the bladder 90 and the wall 27 of the variable pressure vessel 10 are air-tight. Port 94 is used for air input, and port 96 is used for air output. The ports 94 and 96 are connected to valves 46 and 48, respectively. Port 98 is used for the connection of the variable pressure vessel 10 to the hydraulic cylinder 16.

In the case of gas compression when the piston 28 contracts (moves from left to the right in FIG. 17), hydraulic liquid flows from the hydraulic cylinder 16 into the liquid chamber 12, causing the volume of gas in the air chamber 14 to decrease. When the piston 28 expands (moves from right to the left in FIG. 17), the hydraulic liquid flows from the liquid chamber 12 into the hydraulic cylinder 16 and the volume of the gas in the gas chamber 14 increases. When the piston 28 is completely retracted, the volume of gas left in the gas chamber 14 is as low as possible. In this text, the words "gas" and "air" are used interchangeably, as the disclosed unit can be used for the compression of different gases, including air.

The following describes the variable compression vessel 10 in use as an energy storage device with specific reference to the embodiment in FIG. 17. However, it will be appreciated by those skilled in the art that the other embodiments described herein would also be used in a similar fashion.

1. Gas Compression

When the unit shown in FIG. 17 operates as a gas compression unit, the piston 28 of the hydraulic cylinder 16 is moved by a rotational motor, connected to a mechanical converter (not shown) of the rotary motion of the motor to a reciprocal motion. The converter of the rotary motion of the motor to a reciprocal motion drives the piston 28. The valve 46 allows gas to flow only towards the bladder 90, while the valve 48 allows gas to flow only away from the bladder. The valves 46 and 48 may be check valves, solenoid valves or other type of valves.

Step 1.1. When the piston 28 extends (moves from right to the left in FIG. 17), it draws hydraulic liquid from the compression vessel into the hydraulic cylinder. This results in the expansion of the bladder 90 and filling the bladder with a fresh gas from port 94 and valve 46. During the hydraulic cylinder extension, the valve 46 is opened. The valve 48 is closed during the hydraulic cylinder extension.

Step 1.2. In the next step, the piston motion reverses, i.e. starts retracting and as a result, hydraulic liquid flows from the hydraulic cylinder 16 into the compression liquid chamber 12. During the second step, the valve 46 is closed. Step 1.2.1. Initially, the valve 48 is closed. As a result of the inflow of hydraulic liquid, the bladder 90 contracts, compressing the air in the air chamber 14. Step 1.2.2. After reaching the required gas compression pressure, valve 48 opens and the compressed air leaves the bladder via the port 96 and the valve 48 into a compressed gas storage vessel.

After the piston 28 reaches its full retraction, the first step repeats, followed again by the second step and so on. During the compression (step 1.2.1), the compressing gas produces heat. In order to maintain isothermal (or, in the real life, close to isothermal) conditions of the gas, almost all of the produced heat needs to be transferred from the compressing gas to the wall 27 of the variable compression vessel 10. Then, outside of the compression unit, the heat is transferred from the external wall 27 to either the surrounding atmosphere or to a heat transfer liquid, surrounding the variable compression vessel 10. In order to improve the external heat transfer, the external walls of the compression vessel may have fins or other elements described above which increase the heat transfer area, and thus increase the heat transfer rate.

2. Gas Expansion

When the unit shown in FIG. 17 operates as a gas expansion unit, the piston 28 of the hydraulic cylinder 16 supplies with mechanical energy an electrical generator via the converter (not shown) of the reciprocal motion of the piston to the rotary motion of the electrical generator. The converter of the reciprocal motion of the piston to the rotary motion of the motor is driven by the piston 28. Alternatively, a linear electrical generator can be driven by the hydraulic cylinder.

Step 2.1. During the step, the piston 28 extends. Step 2.1.1. In the first part of gas expansion process (FIG. 17), the valve 46 is briefly opened to allow a certain amount of compressed air from the compressed air storage vessel into the bladder 90. The valve 46 is a solenoid or other type of controllable valve. Step 2.1.2. Once enough compressed air enters the bladder 90, the valve 46 is closed. The required compressed gas volume was described previously (PCT/CA2013/050972 and PCT/CA2015/050137). The compressed air, introduced to the air chamber 14, forces the bladder 90 to expand and causes hydraulic liquid to flow from the air chamber 14 into the hydraulic cylinder 16 through the port 98, thus extending the piston 28 (moving it towards the left in FIG. 2).

Step 2.2. In the second step (gas exhaust), the piston retracts and as a result, hydraulic liquid flows from the hydraulic cylinder 16 into the expansion air chamber 14. As a result, the bladder 90 contracts, pushing the air out of the bladder through the port 96 and the valve 48. Valve 48 is a solenoid or other type of controllable valve. Valve 48 is opened during the entire retraction cycle of the piston 28 (step 2.2) and is closed during the piston extension cycle (step 2.1). After finishing the second step (piston 28 retraction), the first step repeats, followed again by the second step and so on. During the gas expansion (step 2.1.2), the expanding gas consumes heat. In order to maintain isothermal (or, in the real life, close to isothermal) conditions of the gas, the consumed heat needs to be supplied from the surroundings outside of the expansion air chamber 14 to the wall of air chamber 14 and then to the expanding gas. In order to improve the external heat transfer, the external walls of the expansion air chamber 14 may have fins or other elements which increase the heat transfer area, and thus increase the heat transfer rate.

Generally speaking, the systems described herein are directed to variable pressure vessels. Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

What is claimed is:

1. A variable pressure system for both the compression and expansion of gases comprising:
   a hydraulic cylinder having a variable working volume responsive to motion of a piston and, wherein the variable working volume of the hydraulic cylinder is increasing during a first stroke and the variable working volume of the hydraulic cylinder is decreasing during a second stroke;
   a gas tank; and
   a variable pressure vessel having a volume and being operably connected to the hydraulic cylinder and operably connected to the tank;
   wherein the variable pressure vessel includes:
   a liquid chamber having a variable volume that decreases responsive to the first stroke and increases responsive to the second stroke;
   a gas chamber having a variable volume that increases responsive to the first stroke and decreases responsive to the second stroke, the gas chamber having an outer wall wherein at least a portion of the outer wall is thermally conductive and allows heat to transfer therethrough; and
   a moveable barrier between the liquid chamber and the gas chamber, and wherein movement of the moveable barrier causes the volume in the liquid chamber and the volume in the gas chamber to displace each other and the volume in the gas chamber plus the volume in the liquid chamber is generally constant and generally equals the volume in the variable pressure vessel.

2. The variable pressure vessel of claim 1 wherein the moveable barrier has a surface area that is generally constant responsive to the first stroke and the second stroke.

3. The variable pressure vessel of claim 1 wherein the moveable barrier is a bladder.

4. The variable pressure vessel of claim 1 wherein the moveable barrier is flexible.

5. The variable pressure vessel of claim 1 wherein the moveable barrier is a polymer bag.

6. The variable pressure vessel of claim 1 wherein the gas chamber is defined by a plate and the moveable barrier.

7. The variable pressure vessel of claim 6 wherein the plate has a high heat conductivity.

8. The variable pressure vessel of claim 6 wherein the plate is a metal, metal alloy or carbon composite plate.

9. The variable pressure vessel of claim 1 wherein the gas chamber is defined by an inner tube and a flexible outer bladder; and
   wherein the flexible outer bladder is the movable barrier.

10. The variable pressure vessel of claim 1 wherein the moveable barrier is a bellows.

11. The variable pressure vessel of claim 10 further including a bellows element located on an inside of the bellows to occupy a central portion of the bellows when the bellows are completely collapsed.

12. The variable pressure vessel of claim 1 wherein the moveable barrier is a plurality of bladders.

13. The variable pressure vessel of claim 1 wherein the moveable barrier is an elongate snake-like flexible tube.

14. The variable pressure vessel of claim 1 wherein the pressure vessel is defined by walls, the gas chamber is defined at least in part by the moveable barrier and the liquid chamber is the volume between the gas chamber and the walls of the pressure vessel.

15. The variable pressure vessel of claim 14 wherein the gas chamber is defined by a plate and the moveable barrier.

16. The variable pressure vessel of claim 15 wherein the plate is a metal, metal alloy or carbon composite plate.

17. The variable pressure vessel of claim 14 wherein the gas chamber is defined by an inner hollow cylindrical tube and a moveable barrier.

18. The variable pressure vessel of claim 17 wherein the moveable barrier is on the outside of the inner hollow cylindrical tube.

19. The variable pressure vessel of claim 17 wherein the moveable barrier is on the inside of the inner hollow cylindrical tube.

20. The variable pressure vessel of claim 18 wherein the inner hollow cylindrical tube defines an inner volume and the inner volume is in flow communication with the liquid chamber and forms part of the liquid chamber.

21. The variable pressure vessel of claim 18 wherein the inner hollow cylindrical tube is defines an inner volume and the inner volume is in flow communication with an inlet and an outlet that is external to the pressure vessel.

22. The variable pressure vessel of claim 21 wherein the inner volume of the inner hollow cylindrical tube is filled with heat transfer fluid.

23. The variable pressure vessel of claim 17 wherein the inner hollow cylindrical tube is made of metal, metal alloy or carbon composite.

24. The variable pressure vessel of claim 1 wherein the variable pressure vessel is a generally cylindrical vessel.

25. The variable pressure vessel of claim 1 wherein the pressure vessel is defined by walls, the gas chamber is defined at least in part by the moveable barrier and the gas chamber is the volume between the liquid chamber and the walls of the pressure vessel.

26. The variable pressure vessel of claim 25 wherein the variable pressure vessel is a generally cylindrical vessel and the moveable barrier is a generally tubular balder attached at each end thereof to the generally cylindrical vessel and the gas chamber is defined by the generally tubular bladder and the generally cylindrical vessel.

27. The variable pressure vessel of claim 1 wherein the liquid chamber and the gas chamber has an interface therebetween and the value of the heat transfer coefficient of the interface can be calculated $$K = [p_1 V_1 A \Delta T / \delta t_{stroke})] \ln(p_1/p_2)$$

and in the process of gas compression $p_1$ is the initial gas pressure, $p_2$ is the final gas pressure after compression, A is the surface of the heat transfer, $\Delta T$ is the difference between the initial and the final temperature, $t_{stroke}$ is the time of the compression stroke, V1 is the gas volume at the start of the compression stroke, $\delta$ is the wall thickness, and in the process of gas expansion $V_1$ is the gas volume at the end of the expansion cycle, $p_1$ is the gas pressure at the beginning of the gas expansion, $p_2$ is the final gas pressure at the end of the expansion and the heat transfer coefficient of the material for the interface is greater than or equal to the calculated K.

28. The variable pressure vessel of claim 19 wherein the inner hollow cylindrical tube defines an inner volume and the inner volume is in flow communication with the liquid chamber and forms part of the liquid chamber.

* * * * *